United States Patent
Blankenship et al.

(10) Patent No.: US 6,738,614 B1
(45) Date of Patent: May 18, 2004

(54) METHOD AND SYSTEM FOR COMMUNICATING DATA TO A WIRELESS DEVICE

(75) Inventors: Steve C. Blankenship, Dallas, TX (US); Thomas L. Garrett, III, Dallas, TX (US)

(73) Assignee: 1477.com Wireless, Inc., Dallas, TX (US)

( * ) Notice: Subject to any disclaimer, the term of this patent is extended or adjusted under 35 U.S.C. 154(b) by 671 days.

(21) Appl. No.: 09/596,805

(22) Filed: Jun. 19, 2000

(51) Int. Cl.[7] .............................................. G06F 13/00
(52) U.S. Cl. ..................................... 455/414.4; 709/219
(58) Field of Search ................................. 455/445, 560, 455/577, 414.2, 414.4, 114.1, 561; 709/230, 219; 707/10

(56) References Cited

U.S. PATENT DOCUMENTS

| | | | |
|---|---|---|---|
| 5,327,529 A | | 7/1994 | Fults et al. ................. 395/155 |
| 5,983,247 A | * | 11/1999 | Yamanaka et al. .......... 715/526 |
| 6,078,994 A | * | 6/2000 | Carey .......................... 711/133 |
| 6,202,072 B1 | * | 3/2001 | Kuwahara ................... 715/513 |
| 6,301,574 B1 | * | 10/2001 | Thomas et al. ................. 707/1 |
| 6,336,137 B1 | * | 1/2002 | Lee et al. .................... 709/219 |
| 6,438,652 B1 | * | 8/2002 | Jordan et al. ............... 711/120 |
| 6,457,030 B1 | * | 9/2002 | Adams et al. ............... 715/523 |
| 6,466,937 B1 | * | 10/2002 | Fascenda ...................... 707/10 |
| 6,507,867 B1 | * | 1/2003 | Holland et al. ............. 709/219 |

* cited by examiner

Primary Examiner—Nay Maung
Assistant Examiner—Nick Corsaro
(74) Attorney, Agent, or Firm—Baker Botts L.L.P.

(57) ABSTRACT

A system for communicating data to a wireless device is disclosed. The system includes a database operable to store data. A web server retrieves the data from the database and converts the data to converted data in real time so as to be interpretable by a wireless device. More specifically, the converted data includes wireless application protocol data. A method for communicating data to a wireless device is disclosed. The method includes receiving data from a database. The received data is converted to converted data in real-time using a converter, and the converter is associated with a web server. The converted data is transmitted to a wireless device that can receive and interpret the converted data. More specifically, the step of converting includes converting the received data to wireless application protocol data, and the step of transmitting includes transmitting the converted data to a wireless application protocol device.

28 Claims, 2 Drawing Sheets

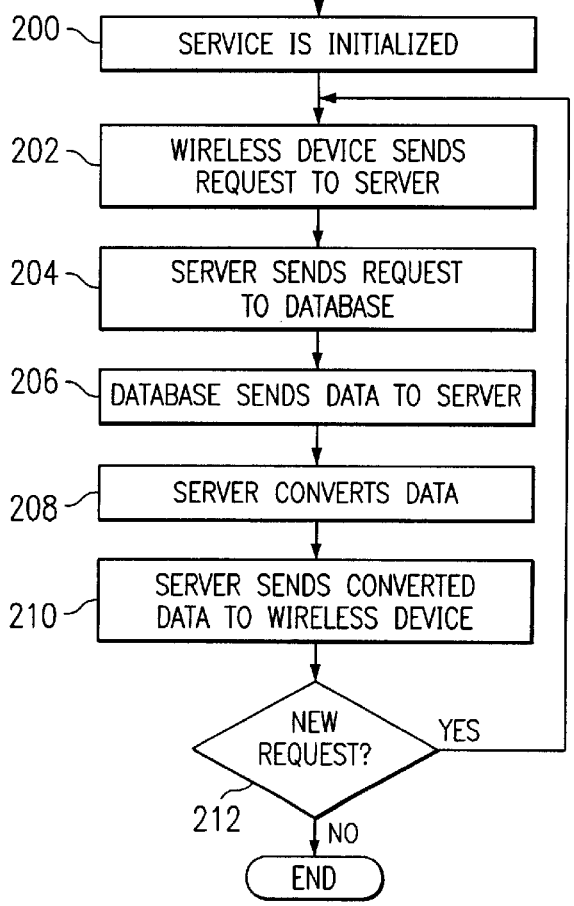
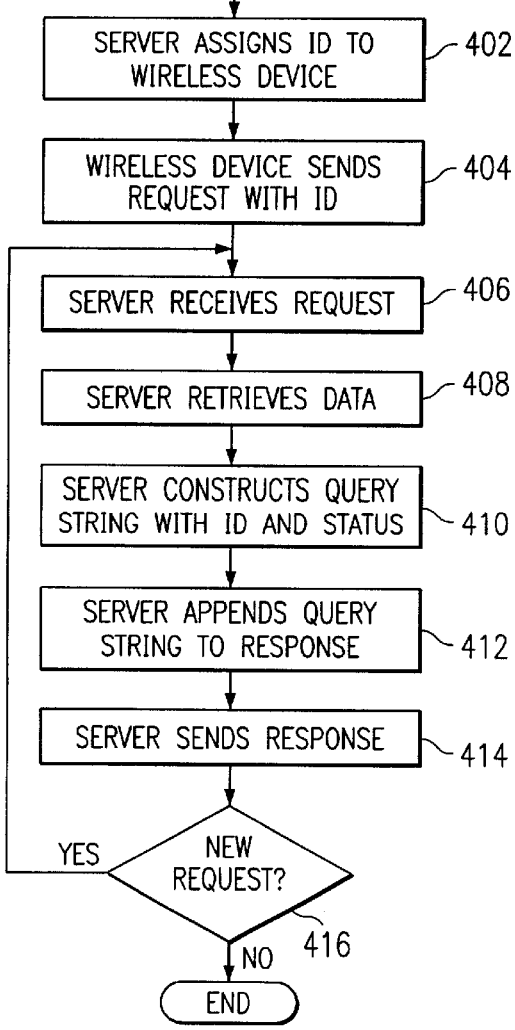
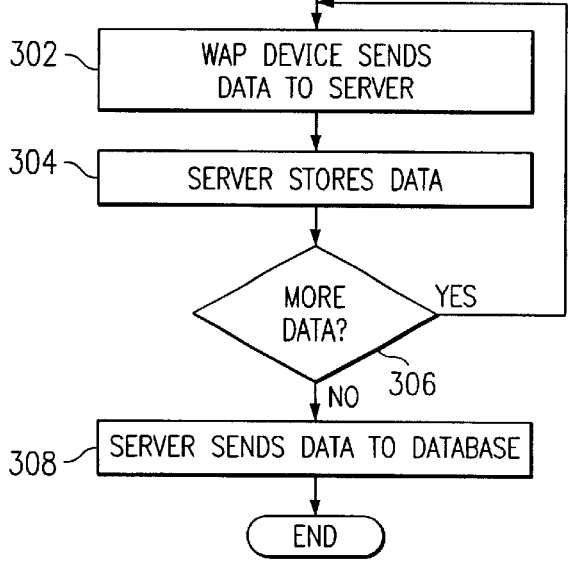

METHOD AND SYSTEM FOR COMMUNICATING DATA TO A WIRELESS DEVICE

TECHNICAL FIELD OF THE INVENTION

This invention relates generally to the field of data communication and more specifically to a method and system for communicating data to a wireless device.

BACKGROUND OF THE INVENTION

The increasing use of wireless devices has led to the demand for fast, effective data communication to and from wireless devices. Wireless devices may be used to communicate data from a company's central database to a mobile employee. A salesperson may, for example, obtain catalog and supply information from a catalog database, or a repairperson may obtain service order information from a service database. Known methods of communicating data involve using a communication network and a web server. These known methods of communicating data, however, are slow and often prone to failure.

While these approaches have provided improvements over prior approaches, the challenges in the field of data communication have continued to increase with demands for more and better techniques having greater effectiveness. Therefore, a need has arisen for a new method and system for communicating data to a wireless device.

SUMMARY OF THE INVENTION

In accordance with the present invention, a method and system for communicating data to a wireless device are provided that substantially eliminate or reduce the disadvantages and problems associated with previously developed systems and methods.

According to one embodiment of the present invention, a system for communicating data to a wireless device is disclosed. The system includes a database operable to store data. A web server retrieves the data from the database and converts the data to converted data in real-time so as to be interpretable by a wireless device. More specifically, the converted data includes wireless application protocol data.

According to one embodiment of the present invention, a method for communicating data to a wireless device is disclosed. The method includes receiving data from a database. The received data is converted to converted data in real-time using a converter, and the converter is associated with a web server. The converted data is transmitted to a wireless device that can receive and interpret the converted data. More specifically, the step of converting includes converting the received data to wireless application protocol data, and the step of transmitting includes transmitting the converted data to a wireless application protocol device.

According to one embodiment of the present invention, a method for converting data is disclosed. The method includes receiving data from a database. The data is converted to converted data in real-time using converter associated with a web server by searching the data for an unacceptable term, wherein a wireless device can not interpret the unacceptable term, and replacing the unacceptable term with an acceptable term associated with the unacceptable term, wherein the wireless device can interpret the acceptable term. The converted data is transmitted. More specifically, the step of converting includes converting the received data to wireless application protocol data.

A technical advantage of the present invention is that it provides users of wireless devices effective real-time access to data from a central database. A web server receives a request from a wireless device and retrieves the requested data from a database. The web server performs real-time conversion to a format accepted by the wireless device, and then transmits the data to the wireless device. The wireless device receives the data and displays the data to the user, allowing the user real-time access to the database.

Other technical advantage are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 is a flowchart demonstrating one embodiment of a method for communicating data to a wireless device that may be used in accordance with the present invention;

FIG. 3 is a flowchart demonstrating one embodiment of a method for communicating data from a wireless device that may be used in accordance with the present invention; and FIG. 4 is a flowchart demonstrating one embodiment of a method for tracking the status of data communicated from a wireless device that may be used in accordance with the present invention.

DETAILED DESCRIPTION OF THE DRAWINGS

Figure 1:
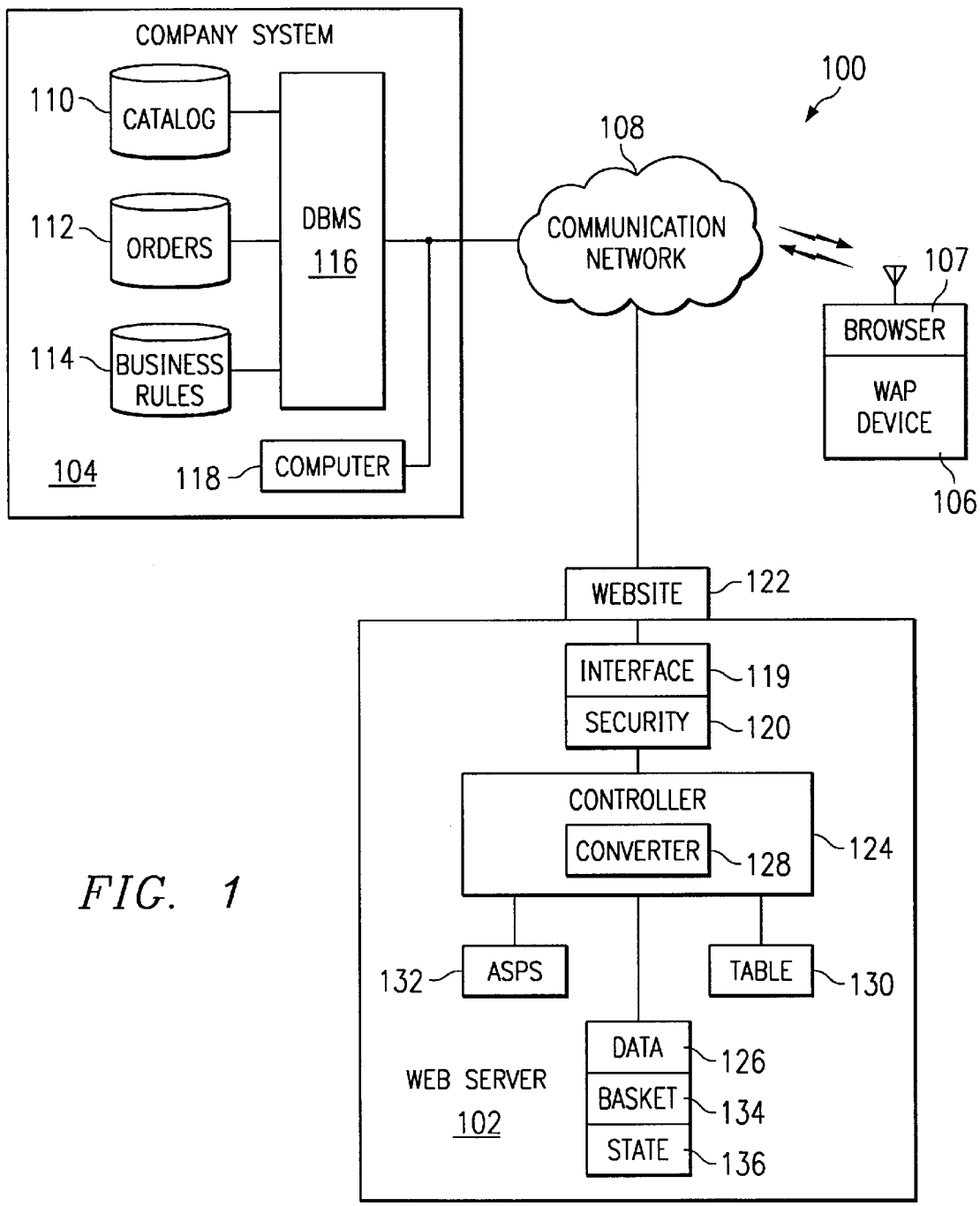
FIG. 1 is a block diagram of one embodiment of a system for communicating data to a wireless device that may be used in accordance with the present invention.

An embodiment of the present invention and its advantages are best understood by referring to FIGS. 1–4 of the drawings, like numerals being used for like and corresponding parts of the various drawings.

FIG. 1 is a block diagram of one embodiment of a system 100 for communicating data to a wireless device that may be used in accordance with the present invention. In one embodiment, a web server 102 communicates data between a company data processing system, for example, company system 104, and a wireless device 106. Web server 102 converts data from company system 104 in real-time to a format accepted by wireless device 106, allowing wireless device 106 real-time access to data from company system 104. An enterprise associated with company system 104 may purchase the services of web server 102 for a payment.

Referring to FIG. 1, web server 102, company system 104, and wireless device 106 communicate data with each other using a communication network 108. Communication network 108 may include wired telecommunications, satellite, microwave, or other suitable wireline or wireless networks, or a combination of the preceding. According to one embodiment, company system 104 includes databases 110, 112, and 114 that are managed by database management system (DBMS) 116. In one embodiment, a catalog database 110 includes information about products manufactured by the enterprise associated with company system 104, for example, the types of products, the quantities of products available, and the prices of the products. An orders database 112 includes information about purchase orders for the products placed by customers of the enterprise, for example, the customers' names, the types of products purchased, and the quantities of the products purchased. A business rules database 114 includes rules for organizing information managed by company system 104 in the databases. DBMS 116 controls the flow of information to and from databases 110, 112, and 114. A user access computer 118, which may comprise, for example, a personal computer, may be used to communicate with DBMS 116 or with web server 102 through a website 122. User access computer 118 may be used to modify business rules database 114 through website 122.

According to one embodiment, web server 102 comprises a computer system or other device coupled to a TCP/IP-based network, running a software program that implements protocols to communicate information between web server 102 and web clients, for example, company system 104 and wireless device 106. In one embodiment, web server 102 may use systems and processes operable to communicate information between company system 104 and wireless device 106. An interface module 119 provides linking capabilities between web server 102 and web clients. Interface module 119 may be customized to interface with a variety of databases. A security module 120 provides computer security, system security, and/or other types of protection.

Website 122 is created and maintained by web server 102 and allows users to obtain services from web server 102. A controller 124 controls the flow of data between company system 104 and wireless device 106. Web server 102 may receive more data from DBMS 116 than wireless device 106 can accommodate. Controller 124 stores the data in a data cache 126 and communicates small parts of the data to wireless device 106 using active server pages (ASPs) 132, which define the presentation of the data on wireless device 106.

Web server 102 may also implement a converter 128. Data from DBMS 116 is often not in a format that can be accepted by wireless device 106. If wireless device 106 receives data in an unacceptable format, communication between web server 102 and wireless device 106 ceases and wireless device 106 loses most if not all data received from web server 102. As needed, an ASP 132 may call on converter 128 to convert data sent to wireless device 106. Converter 128 converts the data to a format accepted by wireless device 106, for example, wireless application protocol (WAP). The wireless application protocol is the de facto worldwide standard for the delivery and presentation of information on wireless devices. A WAP wireless device 106 is operable to interpret data in the WAP format.

The wireless application protocol may implement the wireless markup language (WML) to communicate information to wireless devices. WML provides instructions on how the data is to be displayed on wireless device 106. Converter 128 may convert the data to WML during conversion to an acceptable format. The conversion to WML may involve inserting headers indicating when a page displayed on wireless device 106 starts or when the page stops. Instructions may be inserted to place data on specific areas of the display of wireless device 106. The conversion may also involve inserting links linked to a next page. Converter 128 may also convert unacceptable terms not interpretable by wireless device 106 to acceptable terms interpretable by wireless device 106. Converter 128 may use a lookup table 130 to perform the conversion, as described in more detail in conjunction with FIG. 2.

Web server 102 may also implement caches to store data. A basket cache 134 stores data received from wireless device 106. The data may be temporarily stored until it is transmitted to DBMS 116. A state cache 136 stores information regarding the state of wireless device 106 and the state of any interaction or transaction being conducted using wireless device 106. For example, state cache 136 may store information about the previous request from wireless device 106.

Wireless device 106 may be a wireless application protocol (WAP) device such as a digital cellular telephone, digital pager, or palmtop or laptop computing device. In one embodiment, the wireless application protocol is used to establish communication between web server 102 and wireless device 106. Wireless device 106 may include a web browser 107 to communicate with web server 102. Web browser 107 may be installed as an application on wireless device 106. Web browser 107 contains a WML interpreter that knows how to interpret the WML commands to display the web pages and provides a graphical user interface through which a user can interact with web server 102.

In operation, in one embodiment, web server 102 receives data from company system 104, converts the data, and delivers the data to wireless device 106. Specifically, web server 102 and web browser 107 communicate messages to each other. A message may include a request or response statement, a header with information about the client or web server, and, optionally, data. To obtain information from company system 104, a user of wireless device 106 launches web browser 107 on wireless device 106, and then submits a request for information to web server 102. Content on web server 102 is identified using a uniform resource locator (URL) that distinguishes web server 102 by its domain name and provides the location of a particular file in web server 102's file system.

When a URL is entered into web browser 107 or selected from a predefined menu on web browser 107, web browser 107 sends a WAP request to web server 102 directing it to locate and transmit the requested data. The request message includes the latest version of WAP that web browser 107 supports and the name and location of the requested content. The message also includes a header that describes web browser 107 configuration and which document and image format web browser 107 accepts. The message may also include identification and status information.

In one embodiment, when web server 102 receives the request message, security module 120 authenticates web browser 107 to determine whether the user has access rights to web server 102 and the requested data. If the user has access rights, web server 102 retrieves the requested data. Web server 102 converts the data and constructs a response message. A response statement located at the beginning of the message describes the protocol version and the status of web browser 107's request. The header section of the response message describes the data that follows. Web server 102 transmits the response message to wireless device 106.

FIG. 2 is a flowchart demonstrating one embodiment of a method for communicating data to wireless device 106 that may be used in accordance with the present invention. In one embodiment, a salesperson of the enterprise associated with company system 104 uses his wireless device 106 to request from web server 102 catalog information from catalog database 110 of company system 104. Web server 102 controls the flow of information between company system 104 and wireless device 106 and performs real-time conversion of data from company system 104 into a format accepted by wireless device 106.

Referring to FIG. 2, the method begins at step 200, where the enterprise associated with company system 104 initiates service with web server 102. In one embodiment, the enterprise initiates service through website 122 associated with web server 102. At website 122, an enterprise employee may enter information that may be used to communicate with wireless device 106. The information may contain, for example, categories used to organize the products in catalog database 110. Categories may include, for example, type of product, quantity available, and price. Information may also include categories to organize purchase orders, for example, customer name, type of product, and quantity requested. A user interface of website 122 may be customized to accommodate the categories.

In one embodiment, company system 104 may also provide data to be accessed by wireless device 106 via web server 102. In one embodiment, company system 104 enters information about product type, availability, and price. The information may be provided by a direct coupling between catalog database 110 and web server 102. Alternatively, the information may be input into user access computer 118 and communicated to website 122. Other suitable methods of entering information into web server 102 may be used. Company system 104 may also provide information on users who may access the information of company system 104.

At step 202, wireless device 106 sends a request to web server 102. In one embodiment, the salesperson requests information from catalog database 110. Wireless device 106 communicates the request to web server 102. Web server, in turn, sends a request to DBMS 116 at step 204, which retrieves the information from catalog database 110. At step 206, DBMS 116 sends the data to web server 102. If the data is too much to transmit to wireless device 106 at one time, controller 124 sends only part of the data to wireless device 106 and stores the rest of the data in data cache 126.

ASP 132 receives part of the data from controller 124, and then uses converter 128 to convert the data to a format accepted by wireless device 106, for example, WAP, at step 208. If wireless device 106 receives data in an unacceptable format, wireless device 106 cannot interpret the data. Potentially, communication between web server 102 and wireless device 106 may cease, and wireless device 106 may lose all data received from web server 102. The salesperson would then have to reinitiate contact with web server 102 and re-enter the information in order to start the process from the beginning again. Accordingly, unacceptable data sent to any type of wireless device 106 potentially creates confusion and costly delays for any user of wireless device 106.

Eliminating unacceptable data from the databases of company system 104 may not be an acceptable option because company system 104 may need to use the data. For example, company system 104 may use characters such as "*" and "#" in its catalog descriptions in catalog database 110. A catalog description may include a stock number "#00-000-00" for a product. In the wireless application protocol, however, characters "*" and "#" are used as control codes. When wireless device 106 receives characters "*" and "#", the device interprets the characters as control codes and expects a certain data format. If wireless device 106 receives stock number "#00-000-00", the device may not be able to interpret the data and may lose its ability to receive data.

To communicate data from company system 104 to wireless device 106, web server 102 converts data to an acceptable format as the data is requested. Company system 104 uses characters "*" and "#" in catalog database 110, and thus may not want to convert the data in catalog database 110. Moreover, since catalog database 110 is large and constantly updated, it would be slow and impractical to duplicate catalog database 110 and convert the duplicated data. Web server 102 performs conversion of only requested data, resulting in fast, efficient data communication.

In one embodiment, converter 128 converts the data to an acceptable format, for example, WAP format using WML. Converter 128 converts data in real-time as it is requested. This allows the salesperson real-time access to the data in catalog database 110. The salesperson may instantly check the supply of a product, allowing the salesperson to confirm the availability of the product immediately after a customer requests the product. In one embodiment, the delivery of a product may also be immediately confirmed. In one embodiment, the salesperson may also instantly check the account status of the customer, allowing the salesperson to immediately approve a sale of the product.

During the conversion, converter 128 may search for unacceptable terms and replace them with acceptable terms. Converter 128 may use a lookup table 130 to search for terms not accepted by wireless device 106 and replace them with terms accepted by wireless device 106. TABLE 1 illustrates an example of a table 130 that may be used in accordance with one embodiment of the present invention.

TABLE 1

| Search for | Replace with |
|---|---|
| " | " |
| & | & |
| < | < |
| > | > |
| ' | ' |
| $ | $$ |

In one embodiment, the enterprise associated with company system 104 may purchase access to the converted data that is accepted by wireless device 106. The converted data may be communicated to company system 104 after the data has been converted by converter 128. Company system 104 may communicate the converted data directly to wireless device 106.

At step 210, web server 102 sends the converted data to wireless device 106. If there is a new request at step 212, the method returns to step 202, where wireless device 106 sends the new request to web server 102. If there is no new request at step 212, the method terminates.

FIG. 3 is a flowchart demonstrating one embodiment of a method for communicating data from a wireless device that may be used in accordance with the present invention. In one embodiment, the salesperson submits a customer purchase order. Wireless device 106 transmits the order by sending parts of the order to web server 102 until the order is complete. When the order is complete, web server 102 communicates the order to company system 104.

The method begins at step 302, where wireless device 106 sends purchase order data to web server 102. The data may include, for example, a customer name. The salesperson may input the data by entering a customer number that identifies the customer, by selecting a customer name from a customer list, or by any other suitable method. At step 304, web server 102 stores the data in basket cache 134. If there is more data at step 306, the method moves to step 302, where wireless device 106 sends the additional data. The additional data may be, for example, a product name. The product name may be entered in a manner similar as the customer name or in another suitable manner. At step 304, web server 102 stores the data in basket cache 134.

The method moves to steps 304 and 306 as long as there is more data. When there is no more data, at step 306, the method moves to step 308, where web server 102 transmits the completed purchase order to DBMS 116. Web server 102 transmits the information in basket cache 134 regarding the purchase order to DBMS 116 of company system 104. DBMS 116 then stores the information in orders database 112, and the method terminates.

FIG. 4 is a flowchart illustrating one embodiment of a method for identifying data from a wireless device in accordance with the present invention. In one embodiment, a salesperson requests information from a catalog database. Web server 102 appends an identification and a status code to messages in order to track the data sent to and from wireless device 106.

The method begins at step 402, where web server 102 assigns an identification code (ID) to wireless device 106. At step 404, wireless device 106 sends a request including the ID to web server 102. In one embodiment, wireless device 106 requests the first two lines, lines one and two, of a catalog description of a product type. Web browser 107 of wireless device 106 constructs a request message having the ID and a description of web browser 107's configuration.

At step 406, web server 102 receives the request. Security module 120 authenticates the ID of web browser 107 and any password to check whether the salesperson has access rights to web server 102. If the salesperson has access rights, web server 102 retrieves the requested data at step 408. Web server 102 may retrieve the data from company system 104 and store the data in data cache 126, or may retrieve already-stored data from data cache 126. At step 410, web server 102 constructs the query string for the response message. Wireless device 106's ID is appended to a query string. The status of wireless device 106 is also appended to the query string. In one embodiment, the status includes a message stating that wireless device 106 has been sent lines one and two of the description. At step 412, web server 102 appends the query string to the response. At step 414, web server 102 sends the response to wireless device 106.

If there is a new request at step 416, the method moves to step 406, where web server 102 receives the new request. In one embodiment, the new request is for the next two lines from the product description. The new request includes the ID and status, which identifies wireless device 106 as the sender and indicates that web server 102 has already sent wireless device 106 lines one and two. At step 408, web server 102 retrieves the requested information. From the status, web server 102 determines that wireless device 106 has been sent lines one and two, so the next two lines are lines three and four. Web server 102 retrieves lines three and four from company system data cache 126. At step 410, web server 102 updates the query string to show that web server has sent lines three and four to wireless device 106. The method then moves to step 412, where web server appends the query string to the response. At step 414, web server 102 sends the response to the wireless device 106. If there are no more requests at step 416, the method terminates.

The present invention provides users of wireless devices effective real-time access to data from a central database. A web server receives a request from a wireless device and retrieves the requested data from a database. The web server performs real-time conversion to a format accepted by the wireless device, and then transmits the data to the wireless device. The wireless device receives the data and displays the data to the user, allowing the user real-time access to the database.

Although an embodiment of the invention and its advantages are described in detail, a person skilled in the art could make various alterations, additions, and omissions without departing from the spirit and scope of the present invention as defined by the appended claims.

What is claimed is:

1. A system for communicating data to a wireless device, the system comprising:

a database operable to store data, the data comprising text, the text comprising an unacceptable term; and a web server operable to retrieve the data from the database and to convert the data to converted data in real-time by converting the unacceptable term to a control code corresponding to the unacceptable term according to a lookup table, the lookup table associating the unacceptable term with the control code associated with an acceptable term so as to be interpretable by a wireless device, the wireless device operable to request data from the web server using a wireless device language.

2. The system of claim 1, wherein the converted data is interpretable by a wireless application protocol device.

3. The system of claim 1, further comprising an active server page, the active server page operable to receive the data and to initiate conversion of the data to the converted data.

4. The system of claim 1, further comprising an active server page and a converter, the active server page operable to receive the data and to initialize the converter, the converter operable to convert the data to the converted data.

5. The system of claim 1, further comprising a table operable to associate an unacceptable term not interpretable by the wireless device with an acceptable term interpretable by the wireless device, the web server operable to use the table to convert the data to converted data.

6. The system of claim 1, further comprising a basket cache, wherein the web server is operable receive data from the wireless device, to store the data in the basket cache, and to communicate the stored data to the database.

7. The system of claim 1, wherein the web server is operable to receive a request from the wireless device, the request comprising an identification, to append the identification to a response to the request, and to send the response to the wireless device.

8. The system of claim 1, wherein the web server is operable to receive a request from the wireless device, to append a status to a response to the request, and to send the response to the wireless device.

9. The system of claim 1, further comprising a company system, the company system operable to enter data into the database using the web server.

10. The system of claim 1, wherein the web server is coupled to the database.

11. A method for communicating data to a wireless device, the method comprising:

receiving data from a database, the data comprising text, the text comprising an unacceptable term;

converting the received data to converted data in real-time using a converter by converting the unacceptable term to a control code corresponding to the unacceptable term according to a lookup table, the lookup table associating the unacceptable term with the control code associated with an acceptable term, the converter associated with a web server; and transmitting the converted data to a wireless device operable to request data from the web server using a wireless device language and to receive and interpret the converted data.

12. The method of claim 11, wherein the step of converting comprises converting the received data to wireless application protocol data, and the step of transmitting comprises transmitting the converted data to a wireless application protocol device.

13. The method of claim 11, further comprising:
transmitting the received data to an active server page; and
initializing conversion of the received data using the active server page.

14. The method of claim 11, further comprising:
transmitting the received data to an active server page;
initializing a converter using the active server page; and
converting the received data using the converter.

15. The method of claim 11, further comprising converting the received data using a table operable to associate an unacceptable term not interpretable by the wireless device with an acceptable term interpretable by the wireless device.

16. The method of claim 11, further comprising:
receiving data from the wireless device;
storing the received data in a basket cache; and
communicating the stored data to the database.

17. The method of claim 11, further comprising:
receiving a request from the wireless device, the request having an identification associated with the wireless device;
appending the identification to a response to the request; and
transmitting the response to the wireless device.

18. The method of claim 11, further comprising:
receiving a request from the wireless device;
appending a status to a response to the request; and
transmitting the response to the wireless device.

19. The method of claim 11, further comprising entering data into the database using the web server.

20. A method for converting data, the method comprising:
receiving data from a database at a wireless device, the data comprising text, the text comprising an unacceptable term, the wireless device operable to request data from a web server using a wireless device language;
converting the data to converted data in real-time using a converter, the converter associated with a web server by:

searching the data for the unacceptable term, wherein the wireless device is not operable to interpret the unacceptable term; and
replacing the unacceptable term with an acceptable term associated with the unacceptable term according to a lookup table, the lookup table associating the unacceptable term with a control code associated with the acceptable term, wherein the wireless device is operable to interpret the acceptable term; and
transmitting the converted data.

21. The method of claim 20, wherein the step of converting comprises converting the received data to a wireless application protocol.

22. The method of claim 20, further comprising:
transmitting the received data to an active server page; and
initializing conversion of the received data using the active server page.

23. The method of claim 20, further comprising:
transmitting the received data to an active server page;
initializing a converter using the active server page; and
converting the received data using the converter.

24. The method of claim 20, further comprising converting the received data using a table operable to associate the unacceptable term with the acceptable term.

25. The method of claim 20, further comprising:
receiving data from a wireless device;
storing the received data in a basket cache; and
communicating the stored data to the database.

26. The method of claim 20, further comprising:
receiving a request from a wireless device, the request having an identification associated with the wireless device;
appending the identification to a response to the request; and
transmitting the response to the wireless device.

27. The method of claim 20, further comprising:
receiving a request from a wireless device;
appending a status to a response to the request; and
transmitting the response to the wireless device.

28. The method of claim 20, further comprising entering data into the database using the web server.

* * * * *